United States Patent Office 3,298,460
Patented Jan. 17, 1967

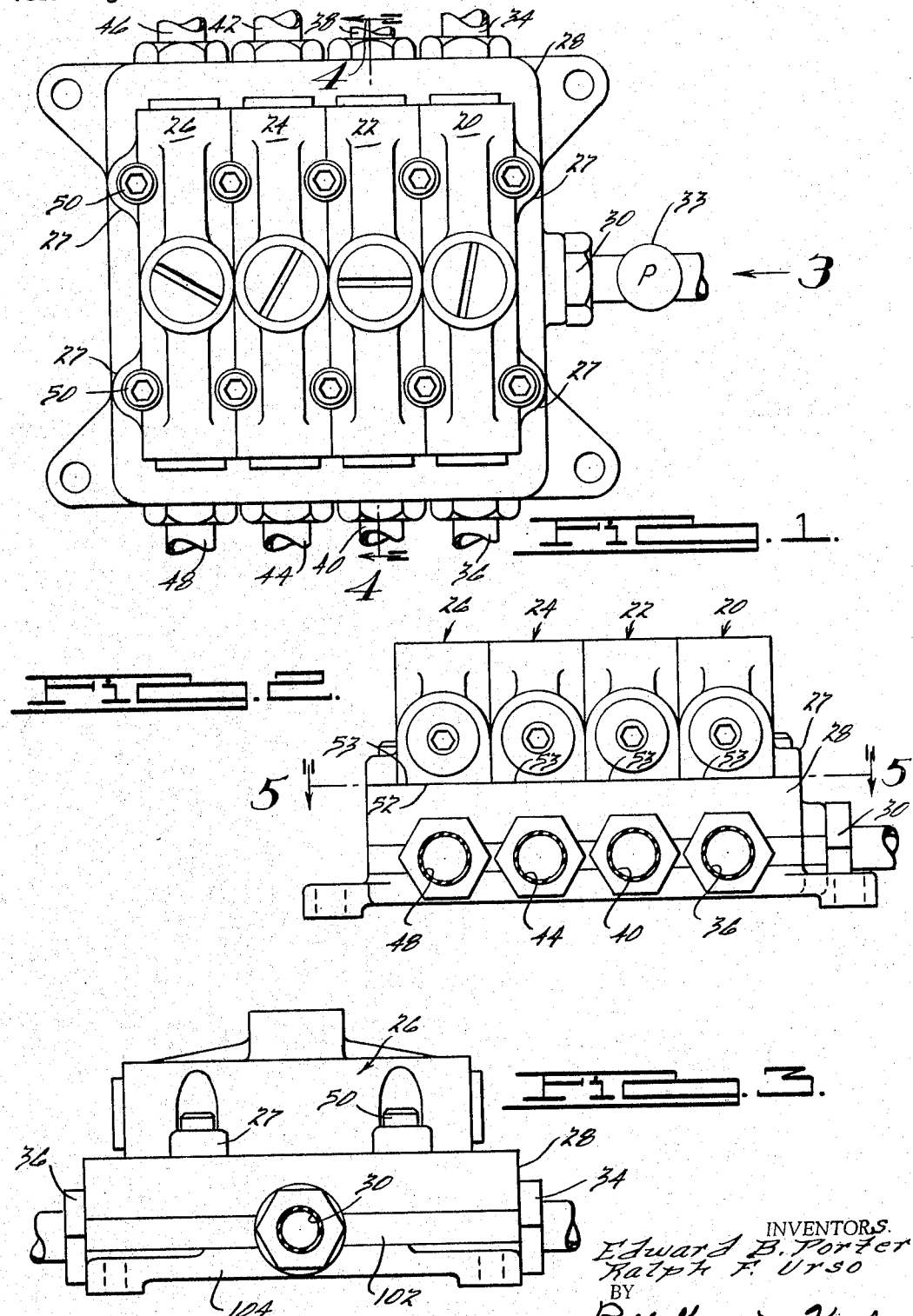

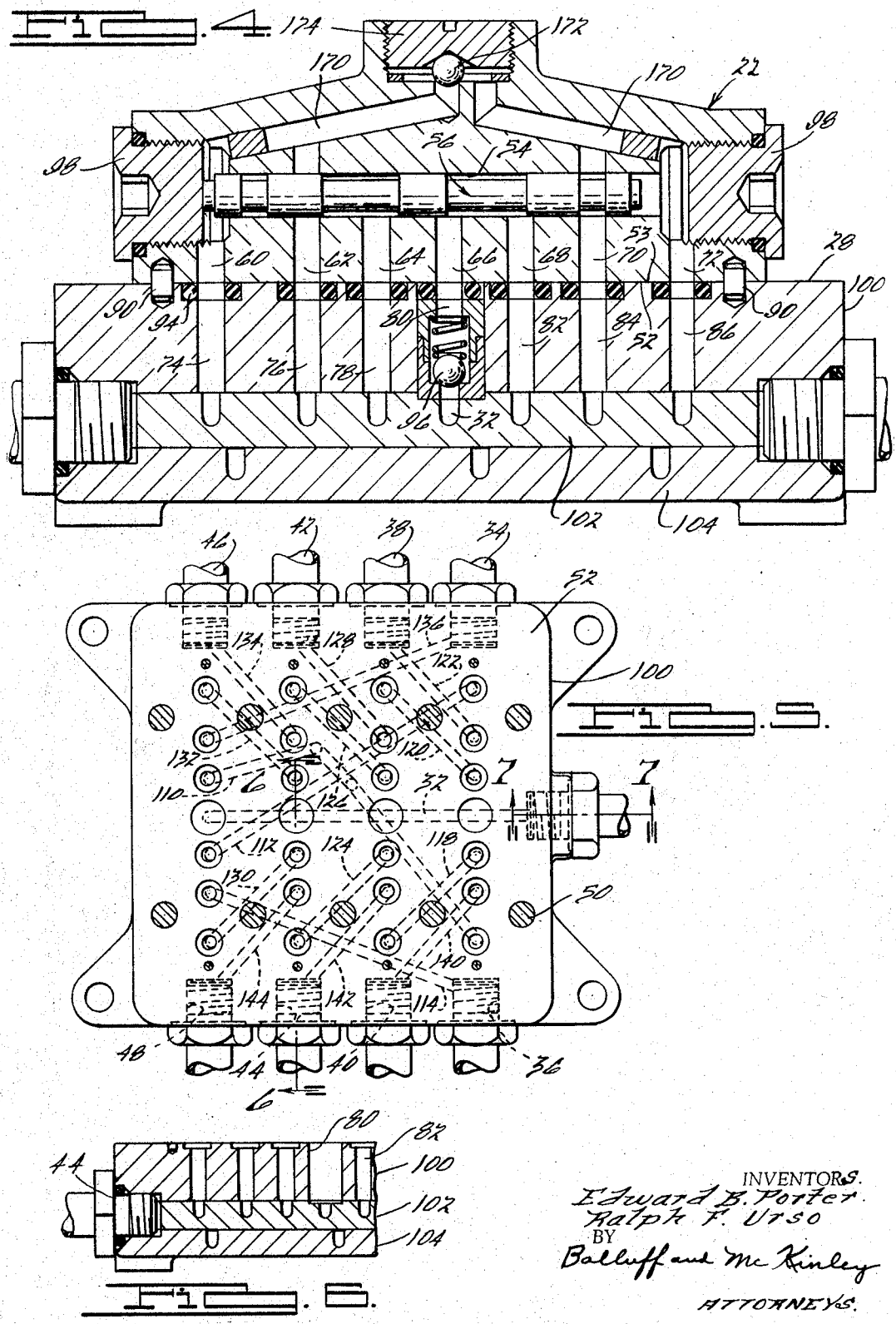

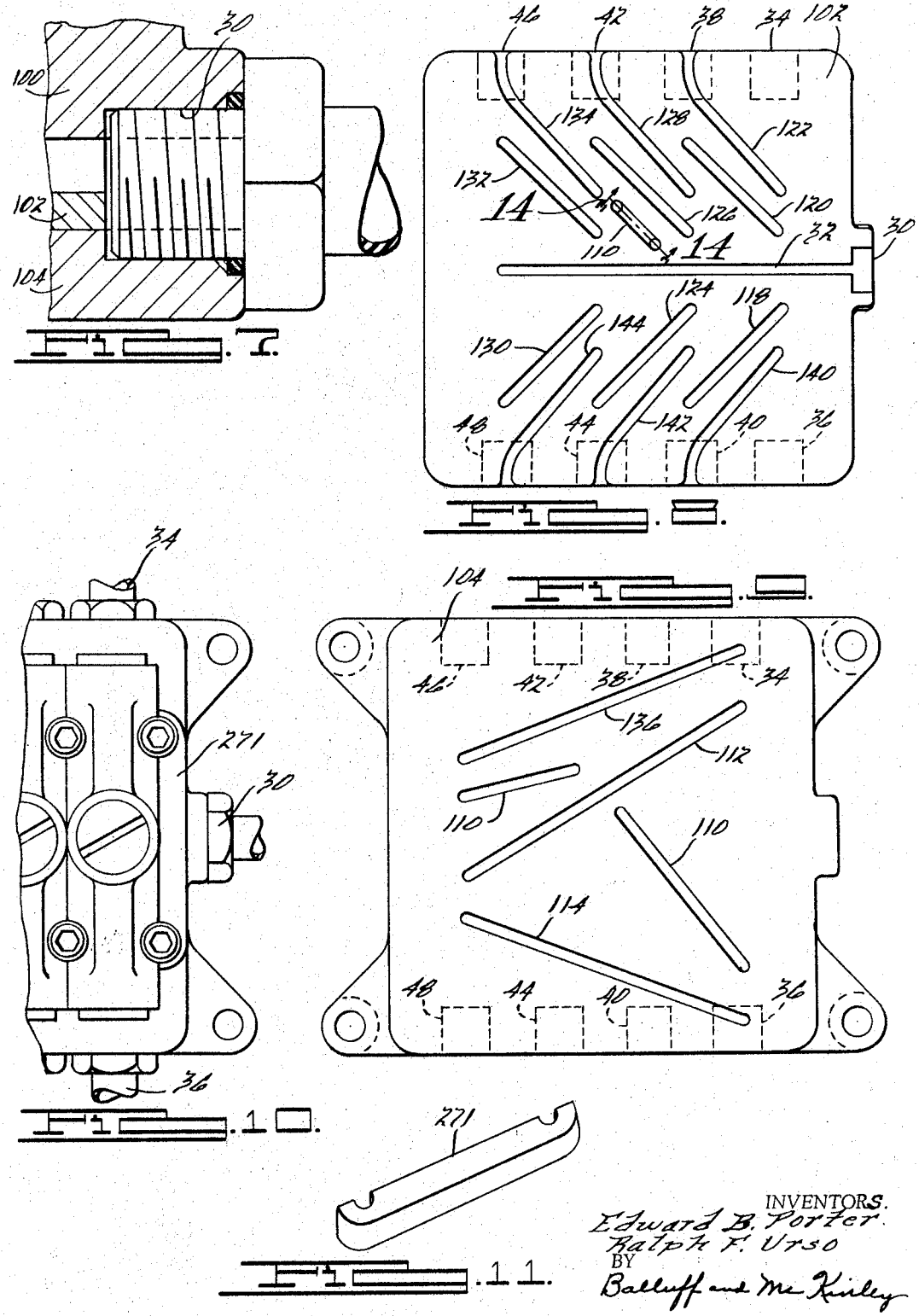

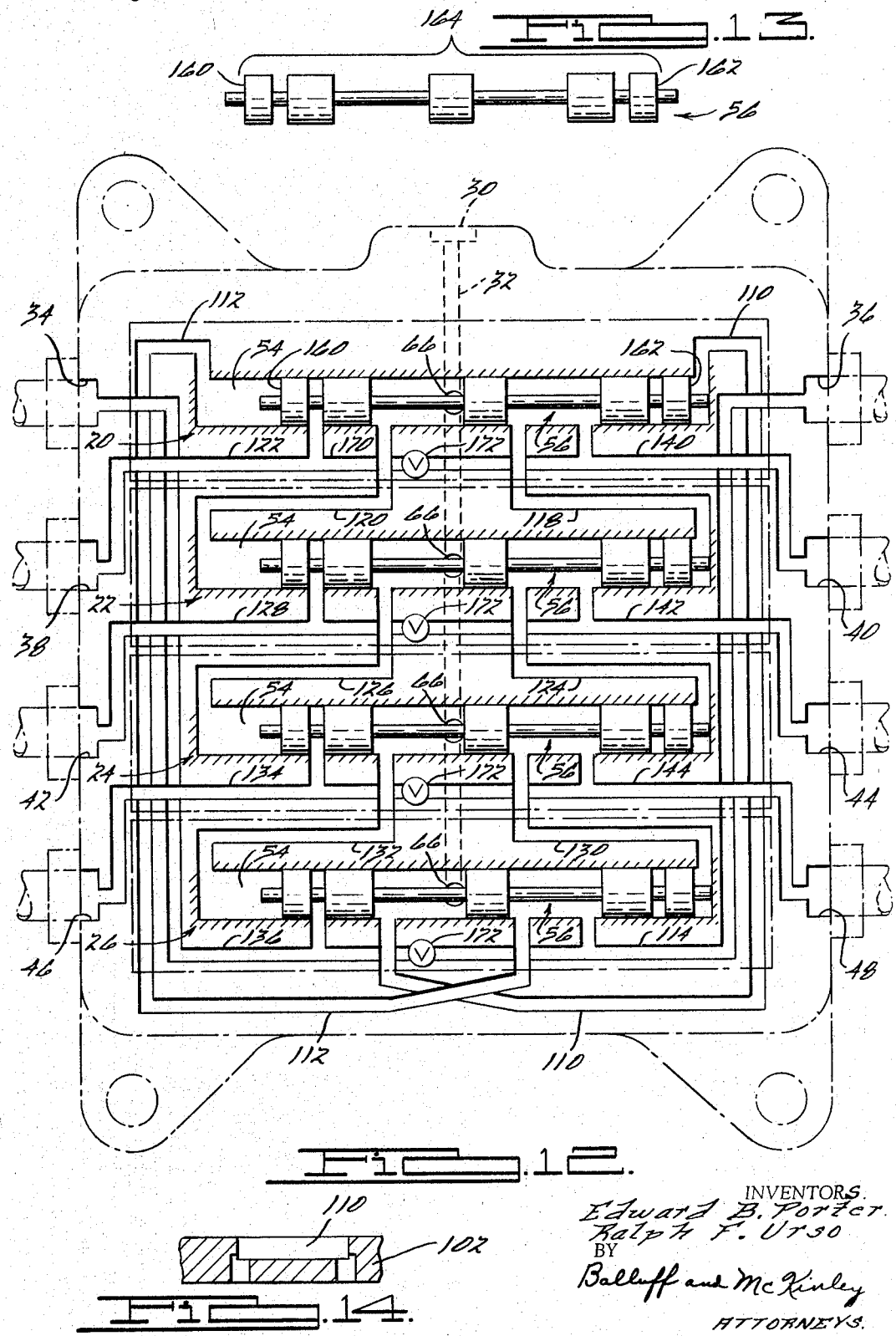

3,298,460
DIVISIONAL LUBRICANT FEEDER
Edward B. Porter, Bloomfield Hills, and Ralph F. Urso, Grosse Pointe, Mich., assignors to McCord Corporation, Detroit, Mich., a corporation of Maine
Filed Aug. 18, 1964, Ser. No. 390,405
7 Claims. (Cl. 184—7)

This invention relates to divisional lubricant feeders of the sequential divider valve type in which the valves are interconnected for the sequential and cyclical discharge of lubricant therefrom. In lubricant feeders of this type, measured charges of lubricant are transmitted under high pressure to a plurality of remote points to be lubricated. The present invention has reference to certain new and useful improvements in construction which enhance the utility of such feeders and greatly simplify the replacement and changing of the valves.

In block type feeders as illustrated, for example, in U.S. Letters Patent No. 2,792,911, the feeder comprises a series of valve blocks secured between end blocks, with the lubricant inlet and outlet connections to the pump and to the bearings connected directly to such blocks. When replacement or servicing of a block is required, it is necessary to disconnect the high pressure threaded couplings used to make the connections to the pump and to the bearings. This is time-consuming because of the number of such couplings, and is also otherwise objectionable because repeated disconnection and connection of such couplings increases the possibilty of lubricant leakage, which cannot be tolerated.

This invention contemplates a lubricant feeder assembly comprising a series of valve blocks which are removably mounted on a base in which the inlet and outlet terminals for the valves are provided whereby any of blocks may be removed and replaced without disturbing the high pressure connection to the pump or the points to be lubricated. The base may form a permanent part of the engine or machine to be lubricated, and each valve block may be readily removed from the base independently of the others for inspection or servicing, and replaced expeditiously.

According to the invention, the base is constructed so as to provide therein the inlet manifold and its terminal, the terminals for the outlets from the valves, and the circuitry which interconnects the valves, the manifold, and the outlet terminals, except for certain porting passages which extend between each valve and its faying face which seats on the base. Each valve is contained in a valve block which is independently secured to the base by a quickly detachable means, such as a series of threaded bolts, whereby each valve may be efficiently removed and replaced without disturbing the other valves or the connections between the base, the points to be lubricated, and the pump.

A principal object of the invention, therefore, is to provide a new and improved divisional lubricant feeder assembly.

Other and further objects of the invention will be apparent from the following description and claims and may be understood by reference to the accompanying drawings, of which there are four sheets, which by way of illustration show preferred embodiments of the invention and what we now consider to be the best mode of applying the principles thereof. Other embodiments of the invention may be used without departing from the scope of the present invention as set forth in the appended claims.

In the drawings:

FIG. 1 is a plan view of a divisional lubricant feeder embodying the invention;

FIG. 2 is a side elevational view thereof;

FIG. 3 is an end elevational view thereof;

FIG. 4 is an enlarged sectional view taken along the line 4—4 of FIG. 1;

FIG. 5 is a sectional view taken along the line 5—5 of FIG. 2;

FIG. 6 is a fragmentary sectional view taken along the line 6—6 of FIG. 5;

FIG. 7 is an enlarged fragmentary sectional view taken along the line 7—7 of FIG. 5;

FIG. 8 is a plan view of the intermediate plate which forms a part of the base;

FIG. 9 is a plan view of the bottom plate which forms a part of the base;

FIG. 10 is a fragmentary plan view illustrating a modified form of the invention;

FIG. 11 is a perspective view illustrating a spacer block used in the modification of FIG. 10;

FIG. 12 is a schematic view illustrating the circuitry of the feeder;

FIG. 13 is a plan view of the five lobed spool; and

FIG. 14 is a sectional view taken along line 14—14 of FIG. 8.

As illustrated in the drawings, a divisional lubricant feeder embodying the invention comprises in general a group of interrelated sequential divider valves 20, 22, 24 and 26 individually mounted upon a base 28. The base is provided with an inlet terminal 30 and a pair of outlet terminals 34-36, 38-40, 42-44, and 46-48 for each of the valves 20, 22, 24 and 26 respectively.

The base 28 is provided with an inlet manifold 32 (FIG. 12) to which the valves 20, 22, 24 and 26 are connected in parallel for the supply of lubricant thereto. The base is provided with outlet terminals 34, 36, 38, 40, 42, 44, 46, and 48 for the valves. The valves 20, 22, 24 and 26 are interconnected by a system of fluid passages for sequential and cyclical discharge of lubricant therefrom through said outlet terminals in response to the continuous supply of lubricant under pressure thereto through the inlet manifold 32. Lubricant is supplied to the inlet manifold under the desired pressure from a suitable source by pump 33.

The valves 20, 22, 24 and 26 are secured to the base 28 by a series of threaded bolts 50, the heads of the bolts reacting against surfaces on the valves for firmly clamping the valves to the base. The bolting arrangement is such that each of the valves is individually secured to the base by four bolts so that each of the valves may be removed independently of the others, the lower threaded ends of the bolts being threaded into the upper surface 52 of the base. Such upper surface 52 (FIG. 2) is a faying surface in intimate contact with the faying surfaces 53 of the valves 20, 22, 24 and 26. The faying surfaces 52 and 53 are flat and smooth.

As illustrated in FIG. 4, each of the divider valves is formed in a valve block and includes a cylinder bore 54, a multi-lobed spool 56, and a series of vertical porting passages 60, 62, 64, 66, 68, 70, and 72 which extend downwardly from bore 54 to the faying face 53. Each valve is mounted with such passages thereof in registry with a series of passages 74, 76, 78, 80, 82, 84 and 86 in the base. Each passage 80, which registers with a passage 66, communicates with the inlet manifold 32 in the base 28. A pair of dowel pins 90 project into dowel holes in each valve and in the upper face 52 of the base for properly aligning each of the valves with the base so that the porting passages above referred to will register. The valve blocks are preferably slightly spaced apart from each other in order to allow for proper alignment on pins 90. Each of the porting passages in the base at its upper end is provided with an enlarged annulus for accommodating an O-ring 94, the O-rings forming a high pressure sealing means between the base and the valves around the porting passages therebetween. A spring loaded ball check valve 96 is interposed in each passage 80 so as to permit flow of lubricant from the inlet manifold 32 through the passages 80, 66 into the bore 54 of the valve while preventing reverse flow. The ends of the cylinder 54 terminate in threaded sockets closed by plugs 98.

The valves 20, 22, 24 and 26 are interconnected by a system of passages which interconnect the valves for sequential and cyclical discharge of lubricant therefrom through the outlets in response to the continuous supply of lubricant under pressure thereto through such inlet manifold, and said system of passages and the passages between the valve bore 54 and the inlet manifold and outlet terminals respectively are disposed in the base except for the vertical porting passages 60, 62, 64, 66, 68, 70 and 72.

The divider valves may be of the same size and capacity, in which event the lubricant will be distributed in equal amounts to the outlet terminals, or any one of the valves may be of larger size and capacity. The valve size and capacity are determined by the diameter of the valve bore 54. With the construction disclosed it is possible to change any one of the valves without removing any of the other valves. In addition, since the series of porting passages 60, 62, 64, 66, 68, 70 and 72 in each of the valves are disposed in the faying face of the valve and symmetrically disposed relative to the inlet porting passage 66, the valve may be reversed end for end; that is, each of the valves can be mounted in either of two positions. In the modification of FIG. 1, each of the end valves 20 and 26 is provided with integral bolt lugs 27 on one side thereof so that such end valves are interchangeable only with each other. However, in the modification of FIGS. 10 and 11, such integral lugs 27 are omitted from the end valves so that all of the valves are not only reversible end for end but also interchangeable. Instead of using integral lugs 27, separate retainers 271 as illustrated in FIGS. 10 and 11 may be employed on the outboard side of each end valve body. The retainers 271 are of the same height as the shoulders on the valves.

In FIG. 12 the spools 56 are all shown in their right hand positions. Each spool consists of a valve portion 164 and two piston ends 160 and 162 (FIG. 13). As is conventional in the art, the entire spool separates the bore 54 into two cylinders, one at each end of the bore 54 and in which bore the spool reciprocates. In the present instance each spool is provided with five lobes. With the cylinder bores and valve passages connected thereto as illustrated in FIG. 12 charged with lubricant under pressure from the inlet manifold 32 through the passages 66, lubricant will flow from a central part of valve portion of bore 54 in valve 26 through the passage 110 into the right hand end of the cylinder bore 54 in valve 20. This will react on the piston end 162 in such bore so as to displace lubricant from the other end thereof through the passage 112 back to the valve portion of the bore 54 of the valve 26. As the pressure thereby exerted on the lobes of the spool 56 in the bore of the valve 26 is balanced, this will cause lubricant to flow through the passage 114 to the outlet 36.

The shifting of the lobed spool to the left in the bore of the valve 20 just described serves to interconnect the inlet 66 in the bore of the valve 20 with the passage 118, whereupon lubricant will flow from the bore of valve 20 through the passage 118 into the right hand end of the bore of valve 22, shifting the spool thereof to the left and displacing lubricant from the left hand end of the bore of such valve through the passage 120 into the cylinder bore of the valve 20 in which the spool is now positioned so that the passage 120 is interconnected by the cylinder bore 54 of the valve 20 with the passage 122 which leads to the outlet 38 so that lubricant will be discharged through such outlet.

The shifting of the lobed spool to the left in the bore of the valve 22 just described serves to interconnect the inlet 66 in the bore of the valve 22 with the passage 124, whereupon lubricant will flow from the bore of valve 22 through the passage 124 into the right hand end of the bore of valve 24, shifting the spool thereof to the left and displacing lubricant from the left hand end of the bore of such valve through the passage 126 into the cylinder bore of the valve 22 in which the spool is now positioned so that the passage 126 is interconnected by the cylinder bore 54 of the valve 22 with the passage 128 which leads to the outlet 42 so that lubricant will be discharged through such outlet.

The shifting of the lobed spool to the left in the bore of the valve 24 just described serves to interconnect the inlet 66 in the bore of the valve 24 with the passage 130, whereupon lubricant will flow from the bore of valve 24 through the passage 130 into the right hand end of the bore of valve 26, shifting the spool thereof to the left and displacing lubricant from the left hand end of the bore of such valve through the passage 132 into the cylinder bore of the valve 24 in which the spool is now positioned so that the passage 132 is interconnected by the cylinder bore 54 of the valve 24 with the passage 134 which leads to the outlet 46 so that lubricant will be discharged through such outlet.

The shifting of the lobed spool to the right in the bore of the valve 26 just described serves to interconnect the inlet 66 in the bore of the valve 26 with the passage 112, whereupon lubricant will flow from the bore of valve 26 through the passage 112 into the left hand end of the bore of valve 20, shifting the spool thereof to the right and displacing lubricant from the right hand end of the bore of such valve through the passage 110 into the cylinder bore of the valve 26 in which the spool is now positioned so that the passage 110 is interconnected by the cylinder bore 54 of the valve 26 with the passage 136 which leads to the outlet 34 so that lubricant will be discharged through such outlet.

The shifting of the lobed spool to the right in the bore of the valve 20 just described serves to interconnect the inlet 66 in the bore of the valve 20 with the passage 120, whereupon lubricant will flow from the bore of valve 20 through the passage 120 into the left hand end of the bore of valve 22, shifting the spool thereof to the right and displacing lubricant from the right hand end of the bore of such valve through the passage 118 into the cylinder bore of the valve 20 in which the spool is now positioned so that the passage 118 is interconnected by the cylinder bore 54 of the valve 20 with the passage 140 which leads to the outlet 40 so that lubricant will be discharged through such outlet.

The shifting of the lobed spool to the right in the bore of the valve 22 just described serves to interconnect the inlet 66 in the bore of the valve 22 with the passage 126, whereupon lubricant will flow from the bore of valve 22 through the passage 126 into the left hand end of the bore of valve 24, shifting the spool thereof to the right and displacing lubricant from the right hand end of the bore of such valve through the passage 124 into the cylinder bore of the valve 22 in which the spool is now positioned so that the passage 124 is interconnected by the cylinder bore 54 of the valve 22 with the passage 142 which leads to the outlet 44 so that lubricant will be discharged through such outlet.

The shifting of the lobed spool to the right in the bore of the valve 24 just described serves to interconnect the inlet 66 in the bore of the valve 24 with the passage 132, whereupon lubricant will flow from the bore of valve 24 through the passage 132 into the left hand end of the bore of valve 26, shifting the spool thereof to the right and displacing lubricant from the right hand end of the bore of such valve through the passage 130 into the cylinder bore of the valve 24 in which the spool is now positioned so that the passage 130 is interconnected by the cylinder bore 54 of the valve 24 with the passage 144 which leads to the outlet 48 so that lubricant will be discharged through such outlet thus completing 8 separate spool shifts and one cycle of the divisional lubricant feeder whereupon all spools are again at their right hand positions. If the pressure on the lubricant in the inlet manifold is maintained, the valve will automatically begin its next cycle.

In some cases it may be desired to combine the discharge of lubricant from the opposite ends of a single valve and to deliver such combined charge to a single bearing. This may be accomplished by blocking the outlet on one side and providing a by-pass between such side and the outlet on the other side. For example, one side of the valve 22 normally discharges through the passage 120, the bore 54 of the valve 20, and the passage 122 to the outlet 38, while the other side of the valve 22 discharges through the passage 118, the bore of the valve 20, and the passage 140 leading to the outlet 40. By providing a by-pass 170 between the passages 122 and 140, the discharge of lubricant from the left-hand end of the valve 22 can be discharged through the outlet 40 by plugging the outlet 38 and opening the by-pass 170. A valve 172 in the by-pass 170 may be employed to close the same. Thus when the by-pass 170 is opened by means of the valve 172 and the outlet 38 plugged, the lubricant discharged from the left hand end of the bore of the valve 22 will flow from the passage 120 into the bore of the valve 20 wherein the spool is now positioned so that the passage 120 is interconnected with the passage 122. However, passage 122 is blocked at the outlet 38 and therefore the lubricant will flow through the opened by-pass 170 into the passage 140 and thence to the outlet 40. As the spool in valve 20 is now in the left hand position, the fluid under pressure in passage 140 is not interconnected with any other passage leading from the bore of valve 20 and is therefore ejected from the outlet 40.

In FIG. 12 we have shown such a by-pass associated with each one of the valves. In the usual installation each outlet is connected to a single bearing to be lubricated. It will be understood that the valve may be made without the by-pass. As illustrated in FIG. 4, the by-pass 170 comprises a series of passages which interconnect spaced parts of the valve bore 54 when the ball valve 172 is removed. The ball valve 172 may be removed upon removal of the threaded plug 174. From FIG. 12 it will be evident that the by-pass for the valve 22 is in the valve 20, so the by-pass illustrated in valve 24 shown in FIG. 4 will be the by-pass for the valve 26. The by-pass feature is optional and, as above noted, each of the valves may be made without the by-pass. Of course, when the ball valve 172 is in place as illustrated in FIG. 4, the by-pass is closed and hence ineffective.

The base 28 preferably comprises a series of plates 100, 102 and 104 which are sandwiched and integrated in any suitable manner. For example, the plates 100, 102 and 104 may be brazed together to form a unit. The upper plate 100 is provided with the tapped holes for the bolts 50 and also with the series of passages 74, 76, 78, 80, 82, 84 and 86 for each of the valves and with the holes for the dowels 90. The plates 102 and 104 are provided with grooves as illustrated which form the inlet manifold 32, part of the connections between the outlets 34, 36, 38, 40, 42, 44, 46 and 48, and the cylinder bores 54, and part of the system of passages which interconnect the valves for sequential and cyclical discharge of lubricant therefrom. Other grooves in the lower plate 104 serve to complete the various passages required. The grooves and passages in the base 28 and in the valves form the circuitry as schematically illustrated in FIG. 12.

The specific construction of the base makes it a relatively simple matter to locate the circuitry in the base, and the individual mounting of each of the valves on the base makes a very simple matter to change any one of the valves independently of the other valves.

While we have illustrated and described preferred embodiments of our invention, it is understood that these are capable of modification and we therefore do not wish to be limited to the precise details set forth but desire to avail ourselves of such changes and alterations as fall within the purview of the following claims.

We claim:

1. In a divisional lubricant feeder assembly having a group of interrelated sequential divider valves, an inlet manifold connected to said valves for supplying lubricant thereto, individual outlets from each of said valves, a system of fluid passages interconnecting said valves for automatic sequential and cyclical discharge of lubricant therefrom through said outlets in response to the continuous supply of lubricant under pressure thereto through said inlet manifold, said assembly comprising a series of at least three valve blocks, a base upon which said blocks are mounted, said base having therein: said manifold; the inlet terminal thereof; the terminals of said outlets from said valves and said system of passages except for portions thereof forming connections with said valves, each of said valve blocks having a divider valve therein, porting passages in said base and valve blocks and extending through the faying faces between said base and each of said valve blocks, certain of said porting passages interconnecting said valves with said manifold and the outlet terminals respectively, and others of said porting passages in said base and valve blocks forming that part of said system which interconnects said valves, high pressure sealing means between said base and valve blocks and around said porting passages therebetween, and removable means individually securing each of said blocks to said base.

2. A divisional lubricant feeder assembly according to claim 1 wherein each of said divider valves comprises a valve block having a cylinder bore, a multi-lobed piston reciprocable therein, and porting passages extending through the block from said bore to the faying face of the block, and wherein said porting passages are disposed in the faying face symmetrically relative to the length and width of the block.

3. In a divisional lubricant feeder assembly having a group of interrelated sequential divider valves, an inlet manifold connected in parallel to said valves for supplying lubricant thereto, individual outlets from each of said valves, a system of fluid passages interconnecting said valves for automatic sequential and cyclical discharge of lubricant therefrom through said outlets in response to the continuous supply of lubricant under pressure thereto through said inlet manifold, said assembly comprising a series of at least three valve blocks, a base upon which said blocks are individually mounted in side-by-side relation, said base having therein: said manifold; the inlet terminal thereof at one end of said base; the terminals of said outlets from said valves along the sides of said base, and said system of passages except for portions thereof forming connections with said valves, each of said valve blocks having a divider valve therein, porting passages in said base and valve blocks and extending through the faying faces between said base and each of said valve blocks, certain of said porting passages interconnecting said valves with said inlet manifold and the outlet terminals respectively, and others of said porting passages forming that part of said system which interconnects said valves, high pressure sealing means between said base and valve blocks and around said porting passages therebetween, and removable means individually securing each of said blocks to said base, each of said valve blocks being constructed so that it may be reversed end for end.

4. In a divisional lubricant feeder assembly having a group of interrelated sequential divider valves, an inlet manifold connected to said valves for supplying lubricant thereto, individual outlets from each of said valves, a system of fluid passages interconnecting said valves for automatic sequential and cyclical discharge of lubricant therefrom through said outlets in response to the continuous supply of lubricant under pressure thereto through said inlet manifold, said assembly comprising a series of at least three valve blocks, a base upon which said blocks are mounted in side-by-side relation, said base having therein: said manifold; the inlet terminal thereof; the terminals of said outlets from said valves and said system of passages except for portions thereof forming connections with said valves, each of said valve blocks having a divider valve therein, porting passages in said base and valve blocks and extending through the faying faces between said base and each of said valve blocks, certain of said porting passages interconnecting said valves with said manifold and the outlet terminals respectively, and others of said porting passages forming part of said system which interconnects said valves, high pressure sealing means between said base and valve blocks and around said passages therebetween, and removable means individually securing each of said blocks to said base, said valve blocks being constructed so that they may be interchangeably mounted on said base.

5. In a divisional lubricant feeder assembly having a group of interrelated sequential divider valves, an inlet manifold connected to said valves for supplying lubricant thereto, individual outlets from each of said valves, a system of fluid passages interconnecting said valves for automatic sequential and cyclical discharge of lubricant therefrom through said outlets in response to the continuous supply of lubricant under pressure thereto through said inlet manifold, said assembly comprising a series of at least three blocks, a base upon which said blocks are mounted in side-by-side relation, said base having therein: said manifold; the inlet terminal thereof; the terminals of said outlets from said valves and said system of passages except for portions thereof forming connections with said valves, each of said blocks having a divider valve therein, porting passages in said base and each of said blocks and extending through the faying faces between said base and each of said blocks, certain of said porting passages interconnecting said valves with said inlet manifold and the outlet terminals respectively, and others of said porting passages forming that part of said system interconnecting said valves, high pressure sealing means between said base and blocks and around said porting passages therebetween, and removable means securing said blocks to said base.

6. A divisional lubricant feeder according to claim 5 including a by-pass between the outlets from one of said valves and wherein said by-pass is disposed in the same block as such valve.

7. A divisional feeder according to claim 5 wherein said base comprises a series of integrated plates in which parts of said passages are formed by grooves in said plates.

References Cited by the Examiner
UNITED STATES PATENTS

| | | | |
|---|---|---|---|
| 2,792,021 | 5/1957 | Greeley | 137—596 |
| 3,215,158 | 11/1965 | Bass et al. | 137—315 X |
| 3,219,146 | 11/1965 | Leese et al. | 184—7 |
| 3,221,769 | 12/1965 | Kiesling | 137—596 |

LAVERNE D. GEIGER, *Primary Examiner.*

H. S. BELL, *Assistant Examiner.*